United States Patent [19]

Sato et al.

[11] Patent Number: 5,793,862
[45] Date of Patent: Aug. 11, 1998

[54] INFORMATION SIGNAL DETECTION DEVICE AND INFORMATION SIGNAL DETECTION METHOD

[75] Inventors: Teruyuki Sato; Toshiaki Nobumoto, both of Kawasaki; Hideaki Kurihara, Fukuoka; Mitsuru Takahashi, Kawasaki, all of Japan

[73] Assignee: Fujitsu Limited, Kanagawa, Japan

[21] Appl. No.: 619,403

[22] Filed: Mar. 21, 1996

[30] Foreign Application Priority Data

Sep. 11, 1995 [JP] Japan .................. 7-232602

[51] Int. Cl.$^6$ .................................................. H04M 1/00
[52] U.S. Cl. .................. 379/386; 379/372; 379/339; 379/351; 379/283
[58] Field of Search .................. 379/283, 333, 379/339, 386, 372, 351, 280; 395/22

[56] References Cited

U.S. PATENT DOCUMENTS

| | | | |
|---|---|---|---|
| 3,934,097 | 1/1976 | Carbrey . | |
| 4,273,965 | 6/1981 | Cowpland et al. | 327/44 |
| 5,214,693 | 5/1993 | Chujo | 379/386 |
| 5,325,427 | 6/1994 | Dighe | 379/386 |
| 5,426,696 | 6/1995 | Zimbrek | 379/386 |
| 5,428,680 | 6/1995 | Murata et al. | 379/386 |
| 5,588,052 | 12/1996 | Murata et al. | 379/283 |
| 5,588,053 | 12/1996 | Xie | 379/386 |
| 5,619,564 | 4/1997 | Canniff et al. | 379/386 |

FOREIGN PATENT DOCUMENTS

| | | | |
|---|---|---|---|
| 57-39689 | 3/1982 | Japan | H04Q 1/45 |
| 58-188989 | 11/1983 | Japan | H04Q 1/45 |

*Primary Examiner*—Krista Zele
*Assistant Examiner*—Charles N. Appiah
*Attorney, Agent, or Firm*—Helfgott & Karas, P.C.

[57] ABSTRACT

An information signal detection device and an information signal detection method are disclosed with which it is possible to transmit information by means of a DTMF signal using a channel that is prone to distortion, such as a high-efficiency channel. The information signal detection device comprises a filter bank component and a logic component. The filter bank component receives via a channel an information signal in which are superposed sine waves of two different frequencies selected from a specific number of frequencies sent by the sender, and generates binary information patterns showing in binary information whether the signal components of the various frequencies of this information signal are present. The logic component recognizes the end of the signal region when the binary information pattern generated in the binary information pattern generation step is containing no binary information showing that a signal component is present continuously for a specific period of time. The logic component also integrates the binary information patterns which indicate that at least one type of frequency signal component is contained and which are output from the filter bank component until the end of the signal period is recognized. One the end of the signal period has been recognized, the logic component decides the contents of the DTMF signal sent from the sender based on these integration results.

10 Claims, 5 Drawing Sheets

INFORMATION SIGNAL DETECTION DEVICE AND INFORMATION SIGNAL DETECTION METHOD

BACKGROUND OF THE INVENTION

1. Field of the Invention

The present invention relates to an information signal detection device and information signal detection method for detecting a DTMF (dual tone multiple frequencies) signal. As one example, it relates to an information signal detection device and information signal detection method used in portable telephones having a simple paging function.

2. Description of the Related Art

A DTMF (dual tone multiple frequencies) signal is one of the signals that have been used up to now for information transmittal. A DTMF signal is composed of two sine waves of different frequencies. The two sine waves that make up a DTMF signal are each selected from preset low- and high-frequency groups, with one wave being selected from among 697, 770, 852, and 954 Hz, and the other wave from among 1209, 1336, 1477, and 1633 Hz.

With a DTMF signal, information is transmitted by means of the frequency components contained in the signal. Specifically, on the sending side, one type of information selected from 16 (=4×4) different types of information (these 16 types of information usually correspond to 16 different keys) is transmitted by deciding upon the combination of the two frequencies that make up the DTMF signal. On the receiving side, analysis of the frequency components of the received signal allows the contents of the DTMF signal sent from the sending side (the sent keys) to be detected.

In the past, the receiving side would detect DTMF signals by using an information signal detection device comprising a filter bank component and a key decision component.

A filter bank component performs processing in which the received DTMF signal is separated into its various frequency components, and processing in which the separated frequency components are rendered binary at a specific threshold, and a flag pattern showing in binary information (flags) whether each of the various frequency components is present is generated. A key decision component periodically searches the contents of the flag pattern input from the filter bank component, and decides what the sent key is whenever the input of a flag pattern in which only one of the flags in each of the low- and high-frequency groups is "1" has continued for a specific period of time.

Thus, the decision component of a conventional information signal detection device decides what the key is whenever the input of a flag pattern in which only one of the flags in each of the low- and high-frequency groups is "1" has continued for a specific period of time. Consequently, with a conventional information signal detection device, the proper key decision sometimes could not be made when noise accounted for a large proportion of the DTMF signal as the signal passed along the channel.

For instance, a system in which voice information is compressed before transmission has been attracting attention in recent years as a system for transmitting voice information efficiently, but since the DTMF signal is greatly distorted with such a system, information transmission was difficult with a conventional information signal detection device.

SUMMARY OF THE INVENTION

An object of the present invention is to provide an information signal detection device and information signal detection method with which it is possible to transmit information by means of a DTMF signal using a channel that is prone to distortion, such as a high-efficiency circuit.

The first information signal detection device of the present invention is equipped with a binary information pattern generation component, an integrating and counting component, and a calculating and deciding component. The binary information pattern generation component receives via a channel an information signal that consists of sine waves of two different frequencies selected from a specific number of frequencies sent by the sender, and generates binary information patterns showing in binary information whether the signal components of the various frequencies of this information signal are present. The integrating and counting component periodically searches the contents of the binary information patterns generated by the binary information pattern generation component, integrates binary information patterns containing binary information showing that signal components are present, and counts the number of binary information patterns that have been integrated. When the binary information pattern generation component has continued to generate a binary information pattern that does not contain binary information showing that a signal component is present for a specific period of time, the calculating and deciding component calculates the average binary information pattern (the integration result from the integrating and counting component divided by the counting result), and decides the contents of the information signal sent by the sender based on the calculated binary information pattern.

Specifically, with the first information signal detection device of the present invention, the end of the signal region is recognized when the binary information pattern generated by the binary information pattern generation component is decided by the decision component to be a binary information pattern showing that signal components of all of the frequencies are not contained continuously for a specific period of time. The integrating and counting component integrates and counts the binary information patterns (flag patterns) generated by the binary information pattern generation component up until the decision component has recognized the end of the signal region. When the end of the signal region has been recognized, the calculating and deciding component calculates the average binary information pattern from the integrating and counting results of the integrating and counting component, and decides the contents of the information signal sent by the sender based on this average binary information pattern.

With the first information signal detection device of the present invention, the decision of the contents of the information signal is performed even if binary information pattern is not continuous. Because of this, with the first information signal detection device, the contents of the information signal sent by the sender are properly decided even if some of the frequency components are missing or shifted as a result of the channel.

A memory component that stores reference patterns which are the average of the binary information patterns generated by the binary information pattern generation component when information signals are input via a channel can be added to the first information signal detection device of the present invention for each of the various information signals used in the information transmittal. In this case, the calculating and deciding component is a component that decides the contents of the information signal sent by the sender by comparing the calculated average binary information pattern with the various reference patterns stored in the memory component.

When an information signal detection device is thus configured, this information signal detection device can be used with channels with distortion, such as one with which a binary information pattern that differs from the original binary information pattern is obtained.

The second information signal detection device of the present invention is equipped with a binary information pattern generation component, a detection counting component, and a decision component. The binary information pattern generation component receives via a channel an information signal that consists of sine waves of two different frequencies selected from a specific number of frequencies sent by the sender, and generates binary information patterns showing in binary information whether the signal components of the various frequencies of this information signal are present. The counting component periodically searches the contents of the binary information patterns generated by the binary information pattern generation component, and counts the number of detections of correct binary information patterns which are binary information patterns corresponding to the information signal used in the information transmittal for each correct binary information pattern. When the binary information pattern generation component has continued to generate a binary information pattern that does not contain binary information showing that a signal component is present for a specific period of time, the decision component decides the contents of the information signal sent by the sender based on the number of detections of the various correct binary information patterns counted by the counting component.

Specifically, with the second information signal detection device of the present invention, the end of the signal region is recognized when the binary information pattern generated by the binary information pattern generation component is decided by the decision component to be a binary information pattern showing that signal components of all of the frequencies are not contained continuously for a specific period of time. The counting component counts the number of detections of correct binary information patterns generated by the binary information pattern generation component up until the decision component has recognized the end of the signal region. When the end of the signal region has been recognized, the decision component decides the contents of the information signal sent by the sender based on the number of detections of the various correct binary information patterns counted by the counting component.

With the second information signal detection device of the present invention, the decision of the contents of the information signal is performed even if binary information pattern is not continuous. Because of this, with the second information signal detection device, the contents of the information signal sent by the sender are properly decided even if some of the frequency components are missing or shifted as a result of the channel. Furthermore, since the device is configured such that a decision is made using only patterns classified as correct binary information patterns, the decision can be made more easily.

A memory component that stores the generation incidence of each of the correct binary information patterns generated by the binary information pattern generation component when information signals are input via a channel can be added to the second information signal detection device of the present invention for each of the various information signals used in the information transmittal. In this case, the decision component is one that decides the contents of the information signal sent by the sender by comparing the number of detections of each of the correct binary information patterns with the various generation incidence patterns stored in the memory component for the respective information signals.

When an information signal detection device is thus configured, this information signal detection device can be used with channels with distortion, such as one with which a binary information pattern that differs from the original binary information pattern is obtained.

Also, the decision component may make its decision by means of a pattern recognition device that incorporates a neural network, for example. In a case such as this, the resulting information signal detection device will be capable of making decisions at a higher speed.

The first information signal detection method of the present invention comprises a binary information pattern generation step, an integrating and counting step, and a calculating and deciding step. In the binary information pattern generation step, an information signal that consists of sine waves of two different frequencies selected from a specific number of frequencies sent by the sender is received via a channel, and binary information patterns showing in binary information whether the signal components of the various frequencies of this information signal are present are generated. In the integrating and counting step, the contents of the binary information patterns generated in the binary information pattern generation step are periodically searched, binary information patterns containing binary information showing that signal components are present are integrated, and the number of binary information patterns that have been integrated are counted. In the calculating and deciding step, the average binary information pattern (the integration result from the integrating and counting step divided by the counting result) is calculated when a binary information pattern, which does not contain binary information showing that a signal component is present, generated in the binary information pattern generation step has continued for a specific period of time, the contents of the information signal sent by the sender are calculated based on the calculated binary information pattern.

Specifically, with the first information signal detection method of the present invention, the calculating and deciding step and the integrating and counting step are carried out in parallel. In the calculating and deciding step, the end of the signal region is recognized when the binary information pattern generated in the binary information pattern generation step is a binary information pattern containing no binary information showing that a signal component is present continuously for a specific period of time. Meanwhile, in the integrating and counting step, the integration of binary information patterns produced in the binary information pattern generation step and containing binary information showing that a signal component is present is periodically performed, and the number of binary information patterns that have been integrated is counted, up until the end of the signal region has been recognized. In the calculating and deciding step, when the end of the signal region has been recognized, the average binary information pattern is calculated from the integrating and counting results of the integrating and counting step, and the contents of the information signal sent by the sender are decided based on this average binary information pattern.

With the first information signal detection method of the present invention, the decision of the contents of the information signal is performed even if binary information pattern is not continuous. Because of this, with the first information signal detection method, the contents of the information signal sent by the sender are properly decided even if some of the frequency components are missing or shifted as a result of the channel.

With the first information signal detection method, the decision step can be a step in which the contents of the information signal sent by the sender are decided by comparing the calculated average binary information pattern with the reference patterns preassigned to each information signal and which are the average of the binary information patterns generated in the binary information pattern generation step when information signals are input via a channel.

With an information signal detection method involving a decision step such as this, the decision of information signals can be accurately carried out even for channels with distortion, such as one with which a binary information pattern that differs from the original binary information pattern is obtained.

The second information signal detection method of the present invention comprises a binary information pattern generation step, a counting step, and a decision step. In the binary information pattern generation step, an information signal that consists of sine waves of two different frequencies selected from a specific number of frequencies sent by the sender is received via a channel, and binary information patterns showing in binary information whether the signal components of the various frequencies of this information signal are present are generated. In the counting step, the contents of the binary information patterns generated in the binary information pattern generation step are periodically searched, and the number of detections of genuine binary information patterns which are binary information patterns corresponding to the information signal used in the information transmittal are counted for each correct binary information pattern. In the decision step, when binary information patterns, which do not contain binary information showing that a signal component is present, are generated for a specific period of time by the binary information pattern generation step, the contents of the information signal sent by the sender are decided based on the number of detections of the various genuine binary information patterns counted in the counting step.

Specifically, with the second information signal detection method of the present invention, the decision step and the integrating and counting step are carried out in parallel. In the decision step, the end of the signal region is recognized when the binary information pattern generated in the binary information pattern generation step is containing no binary information showing that a signal component is present continuously for a specific period of time. Meanwhile, in the integrating and counting step, the number of detections (number of appearances) of each correct binary information pattern generated in the binary information pattern generation step is counted up until the end of the signal region has been recognized. In the decision step, when the end of the signal region has been recognized, the contents of the information signal sent by the sender are decided based on the number of each of the detections in the integrating and counting step.

Thus, with the second information signal detection method of the present invention, the decision of the contents of the information signal is performed even if binary information pattern is not continuous. Because of this, with the second information signal detection method, the contents of the information signal sent by the sender are properly decided even if some of the frequency components are missing or shifted as a result of the channel.

With the second information signal detection method of the present invention, the decision step can be a step in which the contents of the information signal sent by the sender are decided by comparing the calculated average binary information pattern with the generation incidence of each of the genuine binary information patterns generated in the binary information pattern generation step when information signals are input via a channel, which is given ahead of time for each information signal.

With an information signal detection method involving a decision step such as this, the decision of information signals can be accurately carried out even for channels with distortion, such as one with which a binary information pattern that differs from the original binary information pattern is obtained.

Also, a step in which the contents of the information signal are decided by means of a neural network can be employed as the decision step.

DESCRIPTION OF THE PREFERRED EMBODIMENTS

Figure 1:
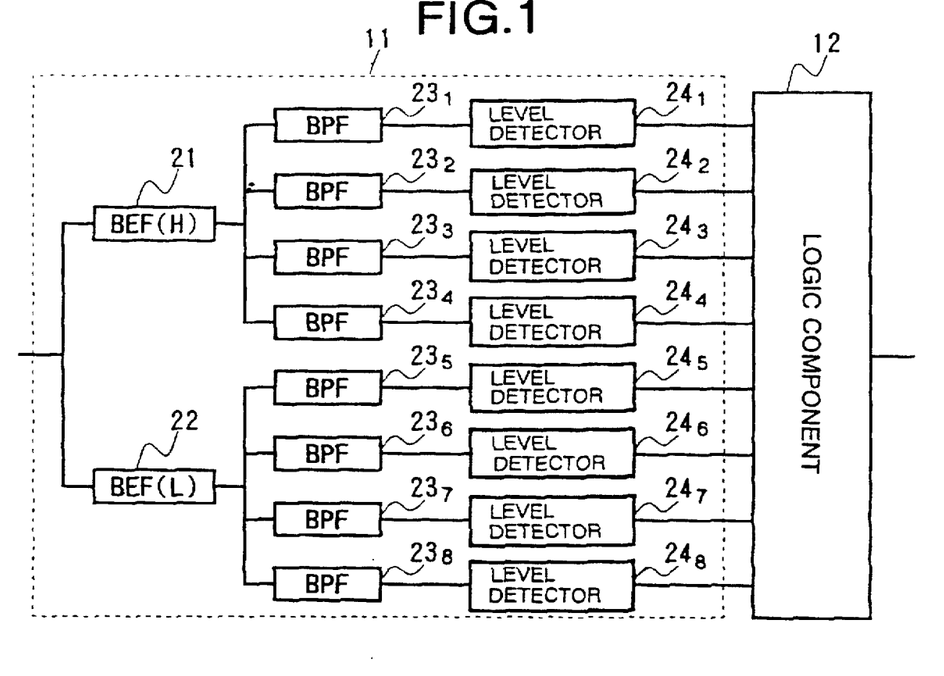
FIG. 1 is a block diagram of the structure of an information signal detection device in the first embodiment of the present invention.

The present invention will now be described in detail through reference to the figures.
First Embodiment FIG. 1 shows the structure of the information signal detection device in the first embodiment of the present invention.

As shown in the figure, this information signal detection device is made up of a filter bank component 11 and a logic component 12. The filter bank component 11 is a circuit that generates a flag pattern (binary information pattern) corresponding to the input DTMF signal. The logic component 12 is a circuit that specifies the contents (the combination of two kinds of frequency) of the DTMF signal sent by the sender based on the flag pattern input from the filter bank component 11, and outputs a key corresponding to the specified contents. The logic component 12 takes the form of DSP (Digital Signal Processor) firmware.

First, the structure and operation of the filter bank component 11 will be described through reference to this figure.

The filter bank component 11 comprises a high-frequency band-elimination filter (BEF-H) 21, a low-frequency band-elimination filter (BEF-L) 22, bandpass filters (BPF) $23^1$ through $23_8$, and level detectors $24_1$ through $24_8$.

The frequencies of the signals that the bandpass filters 23 allow to pass are the frequencies contained in the DTMF signals that are the object of the present device. The bandpass filters $23_1$ through $23_4$ extract frequency components of 697, 770, 852, and 941 Hz, respectively, from a DTMF signal from which the high-frequency component has been removed by the high-frequency band-elimination filter 21. The bandpass filters $23_5$ through $23_8$ extract frequency components of 1209, 1336, 1477, and 1663 Hz, respectively, from a DTMF signal from which the low-frequency component has been removed by the low-frequency band-elimination filter 22. The level detectors 24 convert the signal components output by the bandpass filter 23 into binary form at a specific threshold, and output a signal (flag) of "1" or "0" that indicates whether each of the frequency signal components is present. The flag pattern made up of the eight flags output by the level detectors $24_1$ through $24_8$ is input to the logic component 12.

Figure 2:
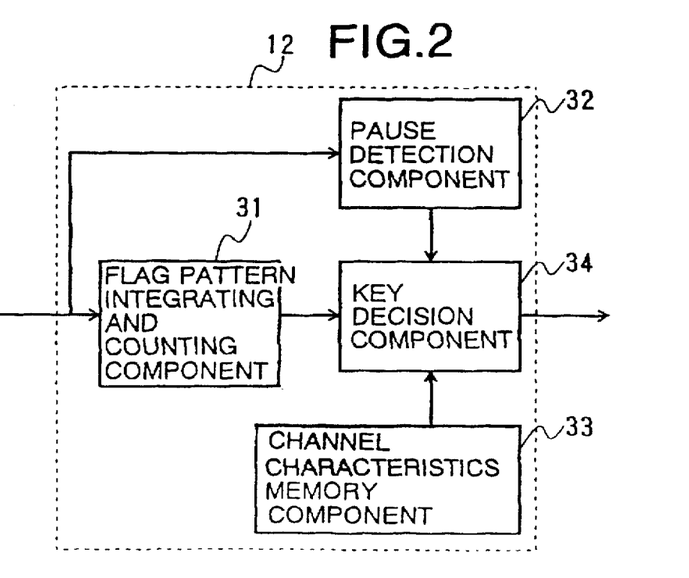
FIG. 2 is a block diagram of the function of the logic component with which the information signal detection device is equipped in the first embodiment of the present invention.

Next, the operation of the logic component 12 will be described through reference to the function block diagram shown in FIG. 2. As shown in the figure, the logic component 12 comprises a flag pattern integrating and counting component 31, a pause detection component 32, a channel characteristics memory component 33, and a key decision component 34. The flag pattern output by the filter bank component 11 is input to the flag pattern integrating and counting component 31 and the pause detection component 32.

The flag pattern integrating and counting component 31 periodically searches the contents of the input flag pattern, and when all of the flags are "0" (when the received DTMF signal contains a signal component of at least one type of frequency), that flag pattern is integrated. The flag pattern integrating and counting component 31 also counts the number of flag patterns that have been integrated.

The pause detection component 32 notifies the key decision component 34 that there is a pause region (the signal region has ended) when the input flag pattern is a flag pattern in which all of the flags are "0" continuously for a specific period of time.

The channel characteristics memory component 33 stores channel characteristics. Channel characteristics is information corresponding to a reference pattern which is the average time data for the flag pattern output by the filter bank component 11 when DTMF signals corresponding to 16 types of key have been sent by the sender with respect to these keys. With this device, data obtained experimentally are used as the channel characteristics.

The key decision component 34 uses the flag pattern integration results and counting results held by the flag pattern integrating and counting component 31 to calculate the average flag pattern (the average value for the flag patterns) when there has been a notification of a pause region from the pause detection component 32. After this, the pause detection component 32 looks for the reference pattern that is closest to the calculated average flag pattern based on the channel characteristics inside the key decision component 34, and outputs the key corresponding to the reference pattern that is found.

Figure 3:
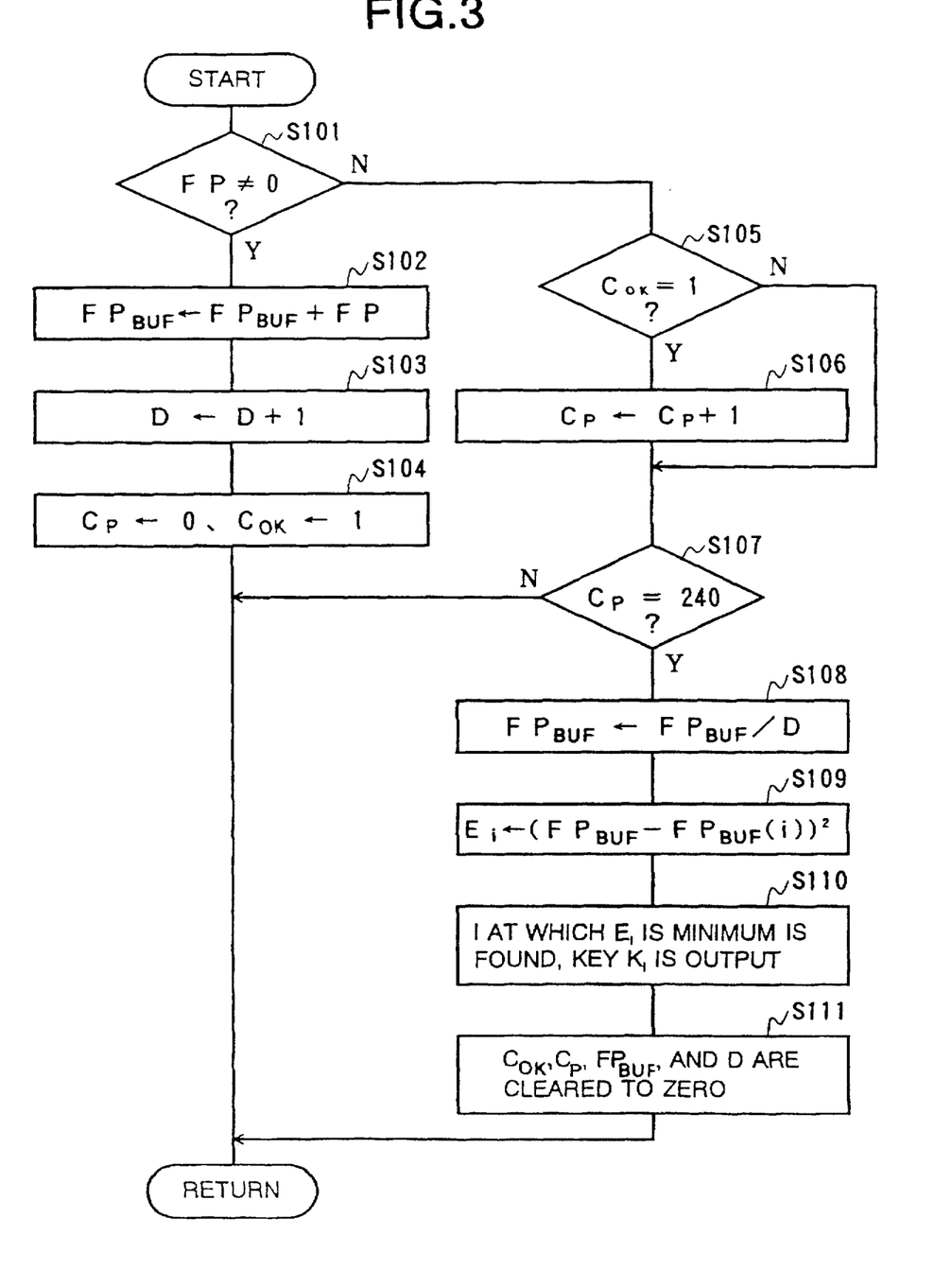
FIG. 3 is a flow chart illustrating the operating procedure of the logic component with which the information signal detection device is equipped in the first embodiment of the present invention.

The operation of the logic component 12 (DSP) in this information signal detection device will now be described in further detail through reference to FIG. 3. The flow shown in this figure corresponds to a single processing procedure performed by the logic component 12 for a flag pattern from the filter bank component 11. During the actual operation of this information signal detection device, this processing is repeated periodically.

When the contents of the flag pattern are searched, the logic component 12 first evaluates whether at least one of the flags of the flag pattern "FP" from the filter bank component 11 is "1" (step S101). If the flags of the flag pattern are non-zero (step S101; Y), the logic component 12 adds this "FP" to the buffer "$FP_{BUF}$" in which the flag pattern integration results are stored (step S102). Next, the logic component 12 adds "1" to the variable "D" in order to count the number of flag patterns that have been integrated (step S103), and sets "$C_P$" to "0" and "$C_{OK}$" to "1" (step S104), which completes the processing.

"$C_P$" is a variable that is used to count the number of continuous detections of a flag pattern in which all of the flags are "0" (hereinafter referred to as "all-zero flag pattern"). In step S101, when there is a branch to the "Y" side, a flag pattern that is not an all-zero flag pattern is detected, so "$C_P$" is cleared to zero in step S104. "$C_{OK}$" is a variable that is set at "0" when a pause region has been recognized. As discussed below, "$C_{OK}$" is used as a variable that will inhibit to count up "$C_P$" in the middle of a pause region after the contents of a key have been decided.

When all of the flags of the flag pattern "FP" from the filter bank component 11 are "0" (step S101; N), the logic component 12 determines whether "$C_{OK}$" is "1" or not (S106), and adds "1" to "$C_P$" only if "$C_{OK}$" is "1" (step S105; Y). Specifically, the logic component 12 only increases the count of "$C_P$" if an all-zero flag pattern has been detected when it has not been confirmed that there is a pause region. Thereafter, the logic component 12 determines whether "$C_P$" is the specific value "240", and if "$C_P$" is not "240" (step S107; N), then processing is concluded.

Meanwhile, when "$C_P$" is "240" (step S107; Y), i.e., when all-zero flag patterns have been detected for 240 consecutive times, the logic component 12 executes key decision processing (steps S108 through S110), which is processing to decide the contents of DTMF signals.

During key decision processing, the logic component 12 first divides "$FP_{BUF}$" by "D" and stores this quotient (average flag pattern) in "$FP_{BUF}$" (step S108). Next, the logic component 12 calculates the square "$E_i$" of the distance between the calculated average flag pattern "$FP_{BUF}$" and the various reference patterns "$FP_{REF}(i)$" (i=1 to 16) given as channel characteristics (step S109). The logic component 12 then finds the "i" at which "$E_i$" is at the minimum distance from the 16 calculated "$E_i$" data, and outputs the key "$K_i$" corresponding to this "i" (step S110).

After this, the logic component 12 clears the variables "$C_{OK}$," "$FP_{BUF}$," and "D," to zero in order to perform processing of the DTMF signal that will be input next (step S111), and processing is completed.

Although not depicted in the flow chart, in step S108 the logic component 12 also decides the size relation between the value of "D" and the predetermined specified value. If the value of "D" is below the specified value, the logic component 12 determines that the signals received up to that point are not DTMF signals, and advances to step S111 without executing steps S109 and S110. With this device, the operation of the logic component 12 in this manner means that when a compound sine wave that momentarily resembles a DTMF signal is input, it will not be mistakenly detected as a DTMF signal.

The operation of this information signal detection device will now be described in more specific terms through reference to FIG. 4.

Figure 4:
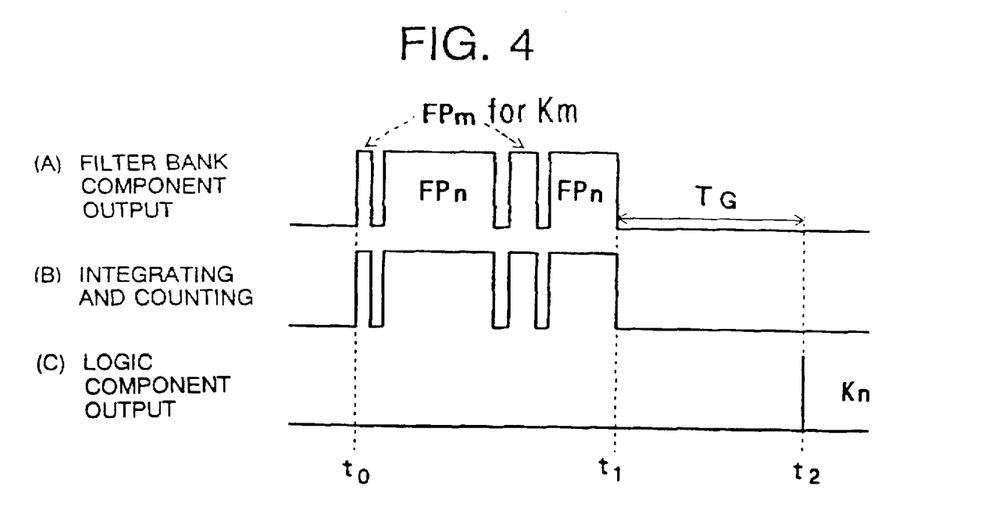
FIG. 4 is a timing diagram used to explain the operation of the information signal detection device in the first embodiment of the present invention.

When the channel is one that results in a great deal of distortion of the DTMF signal, even though the sender has sent a DTMF signal corresponding to a key "$K_n$," a hit (the generation of an all-zero flag pattern) may occur in the flag pattern output from the filter bank component 11, as shown schematically in FIG. 4a, and a flag pattern "$FP_m$" corresponding to a different key "$K_m$" from that of the sent information may be output.

With this information signal detection device, the integration of the contents of the flag patterns other than all-zero flag patterns, and the counting of the number of integrated flag patterns, start at the time "$t_0$" at which a non-zero flag pattern is first detected. Therefore, the contents of "$FP_n$" or "$FP_m$" begin to be integrated as shown schematically in FIG. 4b for the flag pattern shown in FIG. 4a. The number of flag patterns used in the integration is also counted.

A pause region (the completion of the signal region) is then recognized after a time period "$T_G$" (the length of time required for 240 searches) from the start time "$t_1$" of an actual pause region, and at this recognition time "$t_2$" ($t_2 = t_1 + T_G$), the average flag pattern is calculated using the integration and counting values for the non-zero flag patterns input between the time "$t_0$" and the time "$t_1$," and key decision is started using these calculation results.

In the case illustrated in this figure, when an average flag pattern of "$kFP_n+(1-k)FP_m$" is calculated, the logic component 12 looks for the reference pattern closest to the calculated average flag pattern from among the channel characteristics, and outputs the key "$K_n$" corresponding to the found reference pattern as shown in FIG. 4c.

Thus, the information signal detection device pertaining to the first embodiment integrates and counts the non-zero flag patterns up to the point when a pause region is detected (until a specific number of consecutive all-zero flag patterns are detected). When it has been found that there is a pause region, the average flag pattern is calculated using the integration results and the counting results, and the key that should be output is decided by reference to the channel characteristics based on this calculated average flag pattern.

Therefore, with the information signal detection device of the first embodiment, information transmittal is possible even with a channel that would generate an all-zero flag pattern in the middle of the signal region, or with a channel with which there would be a great deal of distortion, such as one with which a flag pattern corresponding to a different key would be generated.

Furthermore, with the information signal detection device of the first embodiment, experimental values for reference patterns of flag patterns obtained for various DTMF signals are stored as channel characteristics. However, functions that convert average flag patterns into keys at the sender may also be stored as channel characteristics. In this case, the average flag pattern and the function thereof are used to configure the logic component 12 so that the key that should be output will be decided upon.

Also, since the processing in which the key to be output is decided from the average flag pattern is processing in which eight types of data (average values for the various flags corresponding to eight different frequencies) are input and one type of data (key) is output, the logic component 12 can also be configured such that this processing is carried out by a neural network. With a configuration such as this, one key will be specified without the difference between the average flag pattern and the various experimental values being calculated, so key decision can be accomplished at a higher speed.

This information signal detection device decides which key the signal indicates after the signal has arrived over a specific time and gone through a pause period, but a delay in decision to this extent poses no practical problems with portable telephones and the like.

Second Embodiment

The information signal detection device pertaining to the second embodiment of the present invention will now be described. The information signal detection device pertaining to the second embodiment differs from the information signal detection device pertaining to the first embodiment only in the operation of the logic component 12.

Figure 5:
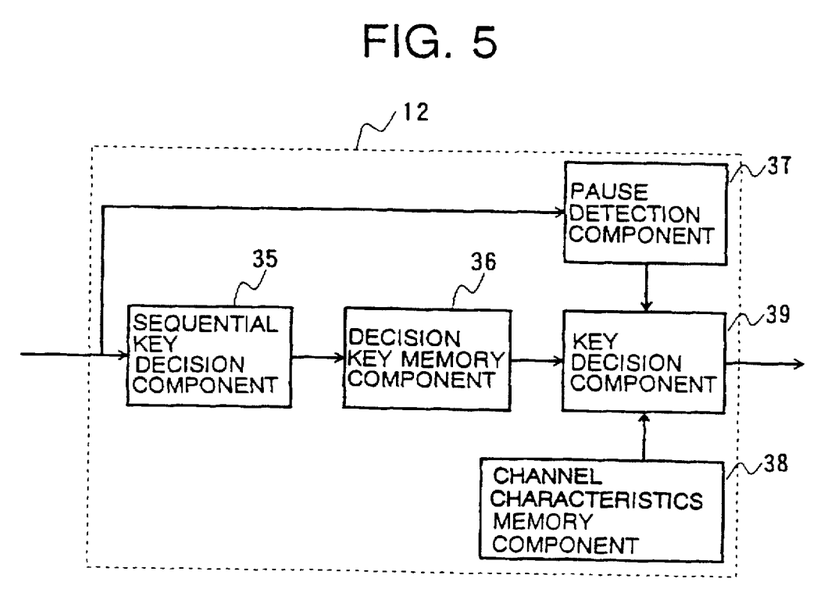
FIG. 5 is a block diagram of the function of the logic component with which the information signal detection device is equipped in the second embodiment of the present invention.

FIG. 5 is a function block diagram of the logic component 12 used in the information signal detection device of the second embodiment. As shown in the figure, the logic component 12 comprises a sequential key decision component 35, a decision key memory component 36, a pause detection component 37, a channel characteristics memory component 38, and a key decision component 39.

The sequential key decision component 35 periodically searches the contents of the flag pattern from the filter bank component 11, and when this flag pattern is a correct flag pattern, this component 35 outputs the key corresponding to this correct flag pattern. "Correct flag pattern" means a flag pattern that corresponds to the DTMF signal used in information transmittal. Specifically, when a flag pattern is detected in which just one flag in each of the low and high frequency groups is "1," the sequential key decision component 35 outputs the key corresponding to this flag pattern.

The decision key memory component 36 receives information from the sequential key decision component 35 and stores the number of times each key has been detected.

When flag patterns in which all of the flags are "0" have been input continuously for a specific period of time, the pause detection component 37 notifies the key decision component 39 that there is a pause region at the present time (that the signal region has ended).

When a DTMF signal corresponding to each key that is the information sent from the sender has been sent in the environment in which this device is used, the channel characteristics memory component 38 stores the channel characteristics that sets the generation incidence of each correct flag pattern (the generation incidence of each key) output from the filter bank component 11. With this information signal detection device, experimental values are used as this channel characteristics, and generation incidence information (reference key patterns) composed of 16 types of data (the generation incidence for each of the 16 different keys) is stored with respect to the various keys at the sender.

When the pause detection component 32 has given notice that there is a pause region, the key decision component 39 looks in the channel characteristics memory component 38 for the reference key pattern that is closest to the detection count information for the various keys held by the decision key memory component 36, and outputs the key corresponding to the found reference pattern.

Figure 6:
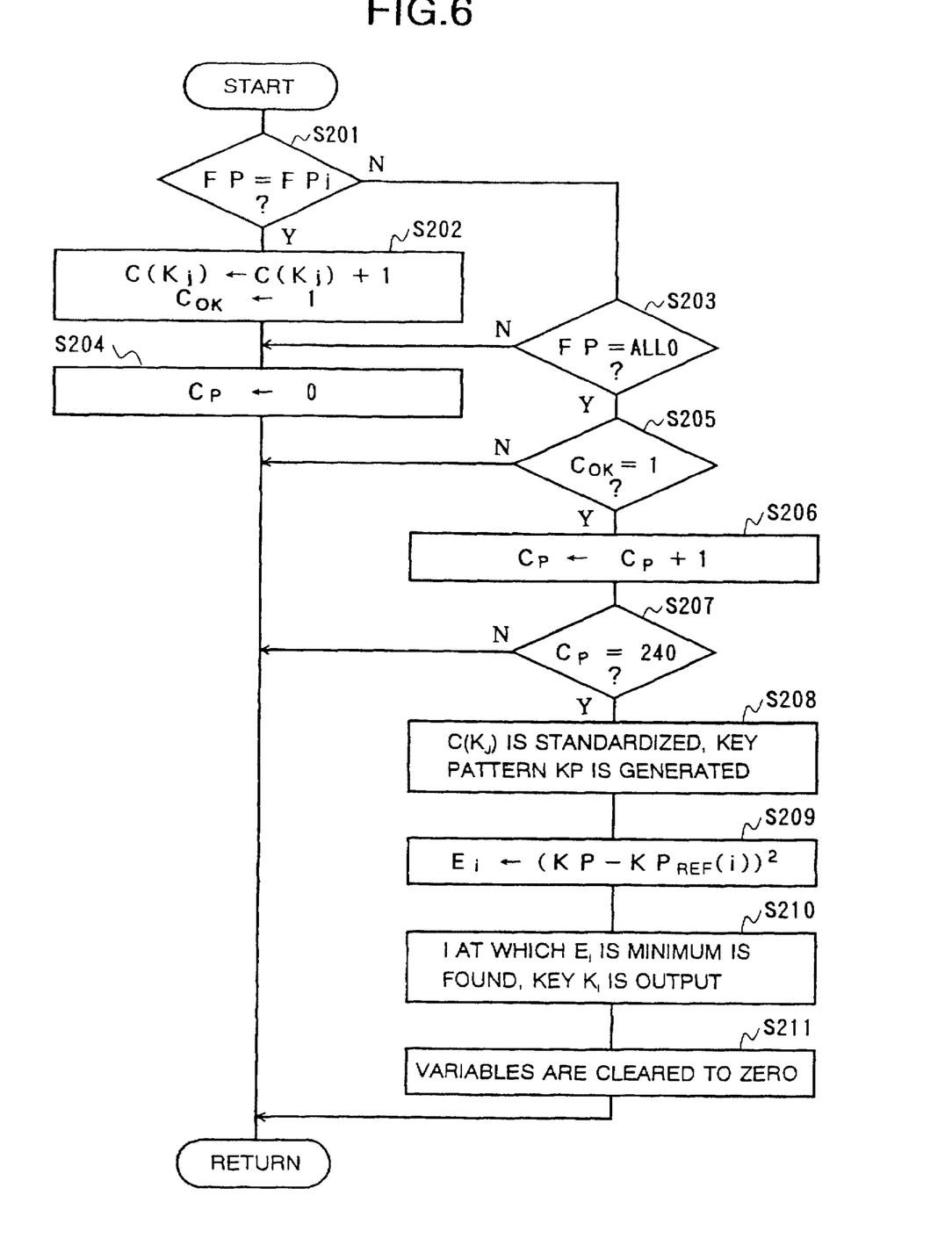
FIG. 6 is a flow chart illustrating the operating procedure of the logic component with which the information signal detection device is equipped in the second embodiment of the present invention.

The detailed operation of the logic component 12 in this information signal detection device will now be described through reference to FIG. 6. The flow shown in this figure corresponds to a single processing procedure performed by the logic component 12 for a flag pattern from the filter bank component 11. During the actual operation of this information signal detection device, the processing shown in this figure is repeated periodically.

As shown in the figure, when the contents of the flag pattern are searched, the logic component 12 first evaluates whether the flag pattern "FP" from the filter bank component 11 matches up with any of the correct flag patterns "$FP_j$" ($j=1$ to 16) (step S201). If there is a correct flag pattern that matches up (step S201; Y), the logic component 12 adds "1" to the detection counter "$C(K_j)$" pertaining to the key "$K_j$," and sets "$C_{OK}$" to "1" (step S202). After this, the logic component 12 sets "$C_P$" to "0" (step S204), and processing is completed.

If the flag pattern "FP" from the filter bank component 11 does not match up with any of the correct flag patterns "$FP_j$" (step S201; N), then the logic component 12 evaluates whether that flag pattern is an all-zero flag pattern (step S203). If it is not an all-zero flag pattern (step S203; N), then the logic component 12 sets "$C_P$" to "0" (step S204), and processing is completed.

Meanwhile, if the flag pattern from the filter bank component 11 is an all-zero flag pattern (step S203; Y), then the logic component 12 evaluates whether "$C_{OK}$" is "1" (step S205). If "$C_{OK}$" is "1" (step S205; Y), then the logic component 12 adds "1" to "$C_P$" (step S206) and moves on to step S207. On the other hand, if "$C_{OK}$" is not "1" (step S205; N), then the logic component 12 moves on to step S207 without changing the value of "$C_P$."

In step S207, the logic component 12 evaluates whether "$C_P$" is "240," and if "$C_P$" is not "240" (step S207; Y), that is, if "$C_P$" is less than "240," processing is completed. If, on the other hand, "$C_P$" is "240" (step S207; Y), then the logic component 12 executes key decision processing (steps S208 to S210).

During key decision processing, the logic component 12 first generates a key pattern vector "KP" by standardizing to "1" the norm of the vector in which the "$C(K_j)$" ($j=1$ to 16) [values] are arranged (step S208). Next, the logic component 12 finds the square "$E_i$" of the distance between the generated "KP" and the various reference patterns "$KP_{REF}(i)$" ($i=1$ to 16) held as channel characteristics (step S209). The logic component 12 then decides the "i" at which "$E_i$" is at the minimum from the 16 "$E_i$" ($i=1$ to 16) [values], and outputs the key "$K_i$" corresponding to this "i" (step S210). After this, the logic component 12 clears the variables to zero in order to perform detection of the DTMF signal that will be input next (step S211), and processing is completed.

Although not depicted in the flow chart, in step S208 the logic component 12 also compares the size relation between the value of "$C(K_j)$" and the predetermined specified value. If none of the 16 "$C(K_j)$" values is a "$C(K_j)$" value of at least the specified value, then the logic component 12 determines that the signals received up to that point are not DTMF signals, and moves on to step S211 without executing steps S209 and S210. With this information signal detection device, the operation of the logic component 12 in this manner means that when a compound sine wave that momentarily resembles a DTMF signal is input, this compound sine wave will not be mistakenly detected as a DTMF signal.

The operation of this information signal detection device will now be described in more specific terms through reference to FIG. 7.

Figure 7:
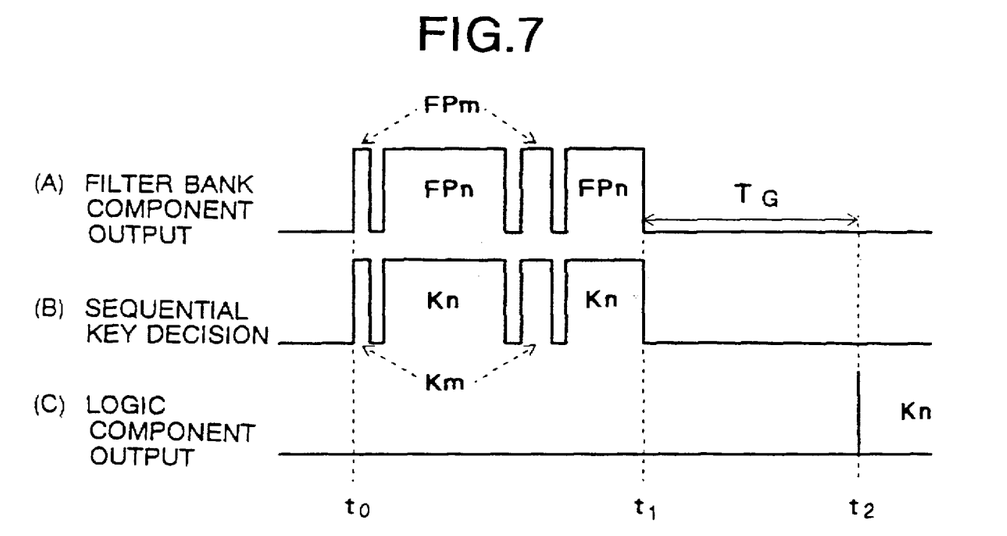
FIG. 7 is a timing diagram used to explain the operation of the information signal detection device in the second embodiment of the present invention.

When the channel is one that results in a great deal of distortion of the DTMF signal, even though the sender has sent a DTMF signal corresponding to a key "$K_n$," a hit (the generation of an all-zero flag pattern) may occur in the flag pattern output from the filter bank component 11, as shown schematically in FIG. 7a, and not a flag pattern "$FP_n$" corresponding to the key "$K_n$" but a flag pattern "$FP_m$" corresponding to a different key "$K_m$" from that of the sent information may be output.

With this information signal detection device, the evaluation of whether or not the input flag pattern is a correct flag pattern starts at the time "$t_0$" at which a non-zero flag pattern is first detected. Therefore, as shown in FIG. 7a, when the filter bank component 11 has output two types of correct flag pattern, then the logic component 12 (the sequential key decision component 35) increases the count on the counter for the key corresponding to each correct flag pattern. The logic component 12 also recognizes that there is a pause region after "$T_G$" time from the start time "$t_1$" of the actual pause region, and starts key decision processing at the time ""$t_2$" ($t_2=t_1+T_G$) using the number of times each correct flag pattern has been detected between the time "$t_0$" and the time "$t_1$."

In the case shown in this figure, the following information is obtained during key decision processing: the number of times the key "$K_n$" has been detected is x times, the number of times the key "$K_m$" has been detected is y times, and the number of times other keys have been detected is 0 times. The logic component 12 generates a key pattern "KP" by normalizing the vector in which these values are arranged such that the norm will be "1." The logic component 12 then looks for the reference key pattern that is closest to the generated key pattern, and outputs a key "$K_n$" that corresponds to the generation incidence information thus found.

Thus, the information signal detection device pertaining to the second embodiment continues counting the number of detections of correct flag patterns until a pause region is detected (until all-zero flag patterns are detected continuously for a specific number of times). When it is found that there is a pause region, then the information signal detection device decides on the key to be output by referring to the channel characteristics based on the number of times each correct flag pattern has been detected.

Accordingly, the information signal detection device of the second embodiment is a device with which information can be transmitted using channels in which all-zero flag patterns are generated in the middle of the signal region, or using channels with a large amount of distortion, such as one with which a flag pattern corresponding to a different key is generated.

Furthermore, with the information signal detection device pertaining to the second embodiment, experimental values for generation incidences of the correct flag patterns (keys) obtained for various DTMF signals are stored as channel characteristics. However, functions that convert various generation incidences into keys at the sender may also be stored as channel characteristics. In this case, the number of times each correct flag pattern has been detected and the function thereof are used to configure the logic component so that the key that should be output will be decided upon.

Also, since the processing in which the key to be output is decided from the number of times each correct flag pattern has been detected is processing in which 16 types of data (data for the number of detections of 16 different keys) are input and one type of data is output, the logic component 12 can also be configured such that this processing is carried out by a neural network. With a configuration such as this, one key will be specified without the difference between the detection count information for the various keys and the various experimental values being calculated, so key decision can be accomplished at a higher speed.

Furthermore, the logic component 12 can also be configured such that no channel characteristics is used, and the key for which the number of detections was greatest is merely output. With a configuration such as this, the processing within the logic component 12 can be made simpler than when channel characteristics is given.

It is apparent that, in this invention, a wide range of different working modes can be formed based on the invention without deviating from the spirit and scope of the invention. This invention is not restricted by its specific working modes except being limited by the appended claims.

What is claimed is:

1. An information signal detection device, comprising:

binary information pattern generation means for receiving, via a channel, an information signal that consists of sine waves of two different frequencies selected from a specific number of frequencies sent by a sender, and generating binary information patterns that consists of binary information showing whether the signal components of the specific number of frequencies are present in the received information signal;

integrating and counting means for periodically searching the contents of the binary information patterns generated by said binary information pattern generation means, integrating binary information patterns containing binary information showing that signal components are present, and counting the number of binary information patterns that have been integrated; and calculating and deciding means for calculating, when said binary information pattern generation means has continued to generate binary information patterns that do not contain binary information showing that a signal component is present for a specific period of time, an average of the binary information patterns that is the integrated binary information patterns divided by the counted number of said integrating and counting means, and deciding the contents of the information signal sent by the sender based on the average of the binary information patterns.

2. An information signal detection device as defined in claim 1, further comprising:

memory means for storing reference patterns which are the average of the binary information patterns generated by said binary information pattern generation means when information signals are input via the channel;

wherein said calculating and deciding means decides the contents of the information signal sent by the sender by comparing the calculated average of the binary information patterns with the reference patterns stored in said memory means.

3. An information signal detection device, comprising:

binary information pattern generation means for receiving, via a channel, an information signal that consists of sine waves of two different frequencies selected from a specific number of frequencies sent by a sender, and generating binary information patterns that consists of binary information showing whether the signal components of the specific number of frequencies are present in the receiving information signal;

counting means for periodically searching the contents of the binary information patterns generated by said binary information pattern generation means, and counting the number of detections of genuine binary information patterns which are binary information patterns corresponding to the information signal used in the information transmittal for each correct binary information pattern; and decision means for deciding the contents of the information signal sent by the sender based on the number of detections of each correct binary information pattern counted by said counting means when said binary information pattern generation means has continued to generate binary information patterns that do not contain binary information showing that a signal component is present for a specific period of time.

4. An information signal detecting device as defined in claim 3, further comprising:

memory means for storing a number of each correct binary information pattern generated by said binary information pattern generation means when information signals are input via the channel;

wherein said decision means decides the contents of the information signal sent by the sender based on the number of correct binary information patterns stored by the memory means for the respective information signals.

5. An information signal detection device as defined in claim 4, wherein the decision means decides the contents of the information signal by means of a neural network.

6. An information signal detection method, comprising:

binary information pattern generation step of receiving, via a channel, an information signal that consists of sine waves of two different frequencies selected from a specific number of frequencies sent by a sender, and generating binary information patterns that consists of binary information showing whether the signal components of the specific number of frequencies are present in the received information signal;

integrating and counting step of periodically searching the contents of the binary information patterns generated in said binary information pattern generation step, integrating binary information patterns containing binary information showing that signal components are present, and counting the number of binary information patterns that have been integrated; and calculating and deciding step of calculating, when said binary information pattern generation step has continued to generate binary information patterns that do not contain binary information showing that a signal component is present for a specific period of time, an average of the binary information patterns that is the integrated binary information patterns divided by the counted number in said integrating and counting step, and deciding the contents of the information signal sent by the sender based on the average of the binary information patterns.

7. An information signal detection method as defined in claim 6, wherein, in the calculating and deciding step, the contents of the information signal sent by the sender are decided by comparing the calculated average of the binary information patterns with the reference patterns preassigned to each information signal and which are the average of the binary information patterns generated in the binary information pattern generation step when information signals are input via a channel.

8. An information signal detection method, comprising:

binary information pattern generation step of receiving, via a channel, an information signal that consists of sine waves of two different frequencies selected from a specific number of frequencies sent by a sender, and generating binary information patterns that consists of binary information showing whether the signal components of the specific number of frequencies are present in the received information signal;

counting step of periodically searching the contents of the binary information patterns generated by said binary information pattern generation step, counting the number of detections of genuine binary information patterns which are binary information patterns corresponding to the information signal used in the information transmittal for each correct binary information pattern; and decision step of deciding the contents of the information signal sent by the sender based on the number of detections of the correct binary information patterns counted in said counting step when said binary information pattern generation step has continued to generate a binary information pattern that does not contain binary information showing that a signal component is present for a specific period of time.

9. An information signal detection method as defined in claim 8, wherein, in said decision step, the contents of the information signal sent by the sender are decided by comparing the calculated average of the binary information patterns with the generation incidence of each of the correct binary information patterns generated in the binary information pattern generation step when information signals are input via a channel, which is given ahead of time for each information signal.

10. An information signal detection device as defined in claim 9, wherein the contents of the information signal are decided in said decision step by means of a neural network.

* * * * *